(12) United States Patent
Bittner et al.

(10) Patent No.: US 10,821,532 B2
(45) Date of Patent: Nov. 3, 2020

(54) ADVANCED HERRINGBONE GEAR DESIGN

(71) Applicant: Sikorsky Aircraft Corporation, Stratford, CT (US)

(72) Inventors: Edward H. Bittner, Madison, CT (US); Bruce D. Hansen, Shelton, CT (US); Christopher John Mussel, Oxford, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 4 days.

(21) Appl. No.: 16/070,978

(22) PCT Filed: Jan. 30, 2017

(86) PCT No.: PCT/US2017/015586
§ 371 (c)(1),
(2) Date: Jul. 18, 2018

(87) PCT Pub. No.: WO2017/136263
PCT Pub. Date: Aug. 10, 2017

(65) Prior Publication Data
US 2019/0022778 A1    Jan. 24, 2019

Related U.S. Application Data

(60) Provisional application No. 62/290,658, filed on Feb. 3, 2016.

(51) Int. Cl.
*B23F 7/00* (2006.01)
*B23H 5/08* (2006.01)
(Continued)

(52) U.S. Cl.
CPC ............... *B23F 7/00* (2013.01); *B23H 5/08* (2013.01); *B23H 9/003* (2013.01); *F16H 1/08* (2013.01); *F16H 55/08* (2013.01)

(58) Field of Classification Search
CPC ... B23F 7/00; F16H 55/08; F16H 1/08; B23H 9/003; B23H 5/08
See application file for complete search history.

(56) References Cited

U.S. PATENT DOCUMENTS 1,647,257 A * 11/1927 Stonebraker ............. B23F 7/00
                                                        409/27
6,912,786 B2    7/2005 Jinkins et al.
(Continued)

FOREIGN PATENT DOCUMENTS

CN      101890540 A       11/2010
CN      104819266 A  *    8/2015  ............... B23F 7/00
(Continued)

OTHER PUBLICATIONS

Wang, CN 104 819 266, Machine Translation, Aug. 2019 (Year: 2015).*

(Continued)

*Primary Examiner* — Lee A Holly
(74) *Attorney, Agent, or Firm* — Michael Best & Friedrich LLP

(57) ABSTRACT

A herringbone gear includes a cylindrical body having a circumferential face having a width. A first helical gear tooth on the circumferential face has a first configuration, a second helical gear tooth on the circumferential face has a second configuration, and a transition on the circumferential face extends between the first helical gear tooth and the second helical gear tooth. An involute form taken within a transverse plane of the circumferential face remains constant over the width.

15 Claims, 6 Drawing Sheets

(51) Int. Cl.
*F16H 1/08* (2006.01)
*B23H 9/00* (2006.01)
*F16H 55/08* (2006.01)

(56) References Cited

U.S. PATENT DOCUMENTS

| | | |
|---|---|---|
| 2003/0056371 A1 | 3/2003 | Honda |
| 2009/0277299 A1* | 11/2009 | Gmirya .................. F16H 1/22 74/665 A |
| 2011/0302783 A1 | 12/2011 | Nagata et al. |
| 2012/0114441 A1 | 5/2012 | Neumaier et al. |
| 2015/0202705 A1 | 7/2015 | Bittner |

FOREIGN PATENT DOCUMENTS

| | | |
|---|---|---|
| CN | 104819266 A | 8/2015 |
| DE | 202014007647 | 3/2015 |
| GB | 220192 A | 8/1924 |
| GB | 239835 A | 7/1926 |

OTHER PUBLICATIONS

International Search Report issued in Application No. PCT/US2017/015586 dated Apr. 17, 2017, 7 pages.
Written Opinion issued in International Application No. PCT/US2017/015586 dated Apr. 17, 2017, 5 pages.
European Search Report for the corresponding European Application No. 17747972; dated Aug. 20, 2019; 8 pages.

* cited by examiner

ADVANCED HERRINGBONE GEAR DESIGN

CROSS REFERENCE TO RELATED APPLICATION

This application is a National Stage application of PCT/US2017/015586, filed Jan. 30, 2017, which claims priority to U.S. Provisional No. 62/290,658 filed Feb. 3, 2016. Both applications are incorporated by reference in their entirety herein.

BACKGROUND OF THE INVENTION

The subject matter disclosed herein generally relates to gear teeth, and more particularly, to improvements in herringbone gear teeth and methods for their manufacture.

Gears are used in various industrial and technological applications to permit power transmission from one rotating or translating element to another. Each gear generally includes an array of gear teeth that mesh with the gear teeth of another gear so that the rotation or translation of the first gear can be transmitted to the second. The shapes of the gear teeth can be varied with some gear teeth being linearly shaped, some being helically shaped and others being provided as double-helical or herringbone shaped.

Spur gears have gear teeth that are arranged parallel to the axis of rotation. Helical gears have an array of teeth following helical paths, arranged around the axis of rotation. Helical gears are preferred for use in high speed and high torque gearboxes since they transmit power between each other in a quieter and more efficient manner. Efficiency and strength can be further improved by providing the gear teeth with a very smooth finish by finish-grinding the teeth for example.

Gears having gear teeth that are double-helically (or herringbone) shaped include a side-to-side (not face to face) combination of two helical gears of opposite hands and, from a top-wise viewpoint, the helical grooves form a V formation with an apex in the middle. Whereas single helical gears tend to produce axial loading, for double-helical or herringbone gears, a side-thrust of one half of each gear is balanced by that of the other half. This means that gears having double-helical or herringbone shaped gear teeth can be used in gearboxes without requiring substantial thrust bearings.

BRIEF DESCRIPTION OF THE INVENTION

According to one embodiment, a herringbone gear includes a cylindrical body having a circumferential face having a width. A first helical gear tooth on the circumferential face has a first configuration, a second helical gear tooth on the circumferential face has a second configuration, and a transition on the circumferential face extends between the first helical gear tooth and the second helical gear tooth. An involute form taken within a transverse plane of the circumferential face remains constant over the width.

In addition to one or more of the features described above, or as an alternative, in further embodiments wherein the first configuration and the second configuration are opposites.

In addition to one or more of the features described above, or as an alternative, in further embodiments the transition includes a radius.

In addition to one or more of the features described above, or as an alternative, in further embodiments conjugate motion occurs over an entire surface of the first helical gear tooth, the transition gear tooth and the second helical gear tooth when meshed with a corresponding herringbone gear.

In addition to one or more of the features described above, or as an alternative, in further embodiments the herringbone gear is installed within a power transmission assembly.

In addition to one or more of the features described above, or as an alternative, in further embodiments the power transmission assembly is part of a rotary wing aircraft.

According to one embodiment of the invention, a method of forming a double-helical gear includes forming a portion of an aligned first gear tooth, transition, and second gear tooth via a single pass of a spindle such that an involute form taken within a transverse plane remains constant over a width of the gear.

In addition to one or more of the features described above, or as an alternative, in further embodiments In addition to one or more of the features described above, or as an alternative, in further embodiments a longitudinal axis of the spindle is arranged generally perpendicular to an axis of rotation of the gear, the longitudinal axis extending through the gear.

In addition to one or more of the features described above, or as an alternative, in further embodiments forming the transition includes varying an orientation of the longitudinal axis of the spindle relative to the gear to maintain a constant involute form in the transition.

In addition to one or more of the features described above, or as an alternative, in further embodiments a portion of the first gear tooth is formed by moving the spindle generally linearly.

In addition to one or more of the features described above, or as an alternative, in further embodiments a portion of the second gear tooth is formed by moving the spindle generally linearly.

In addition to one or more of the features described above, or as an alternative, in further embodiments the spindle includes a grinding wheel configured to rotate about the longitudinal axis of the spindle.

In addition to one or more of the features described above, or as an alternative, in further embodiments the spindle is configured to removed material from the gear via electrochemical grinding.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

In aerospace transmission design, transmission weight reduction is of considerable importance. Thus, since the gears inside a transmission are normally the heaviest components in a drive system, reducing gear size and number of gears can be useful in reducing transmission weight and volume. As will be described below, gear size reductions can be achieved by eliminating extraneous gear features, and improving the efficiency of the gears that are included.

Figure 1A:
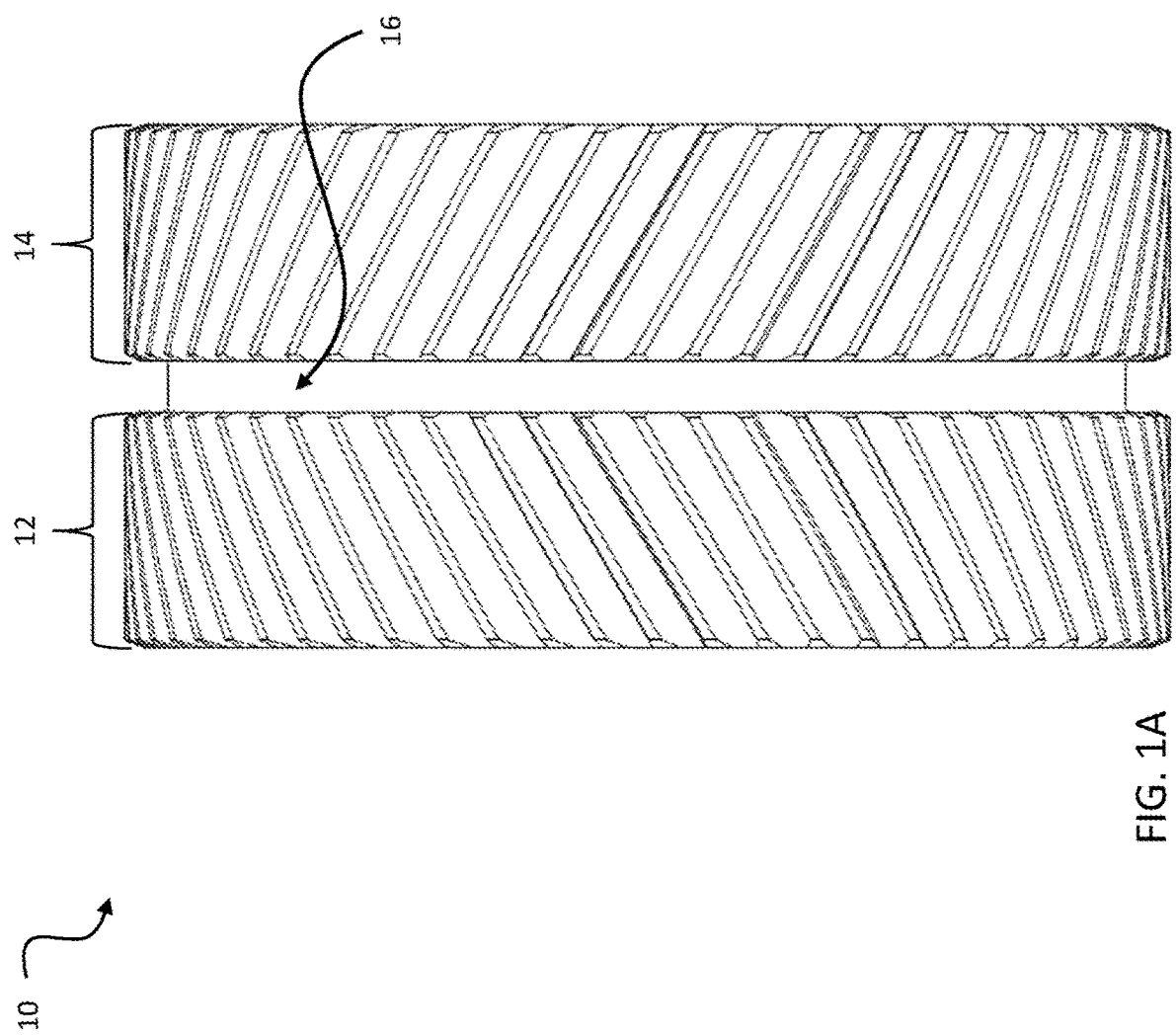
FIG. 1A is a front view of an example of a double-helical gear having an apex gap.
Figure 1B:
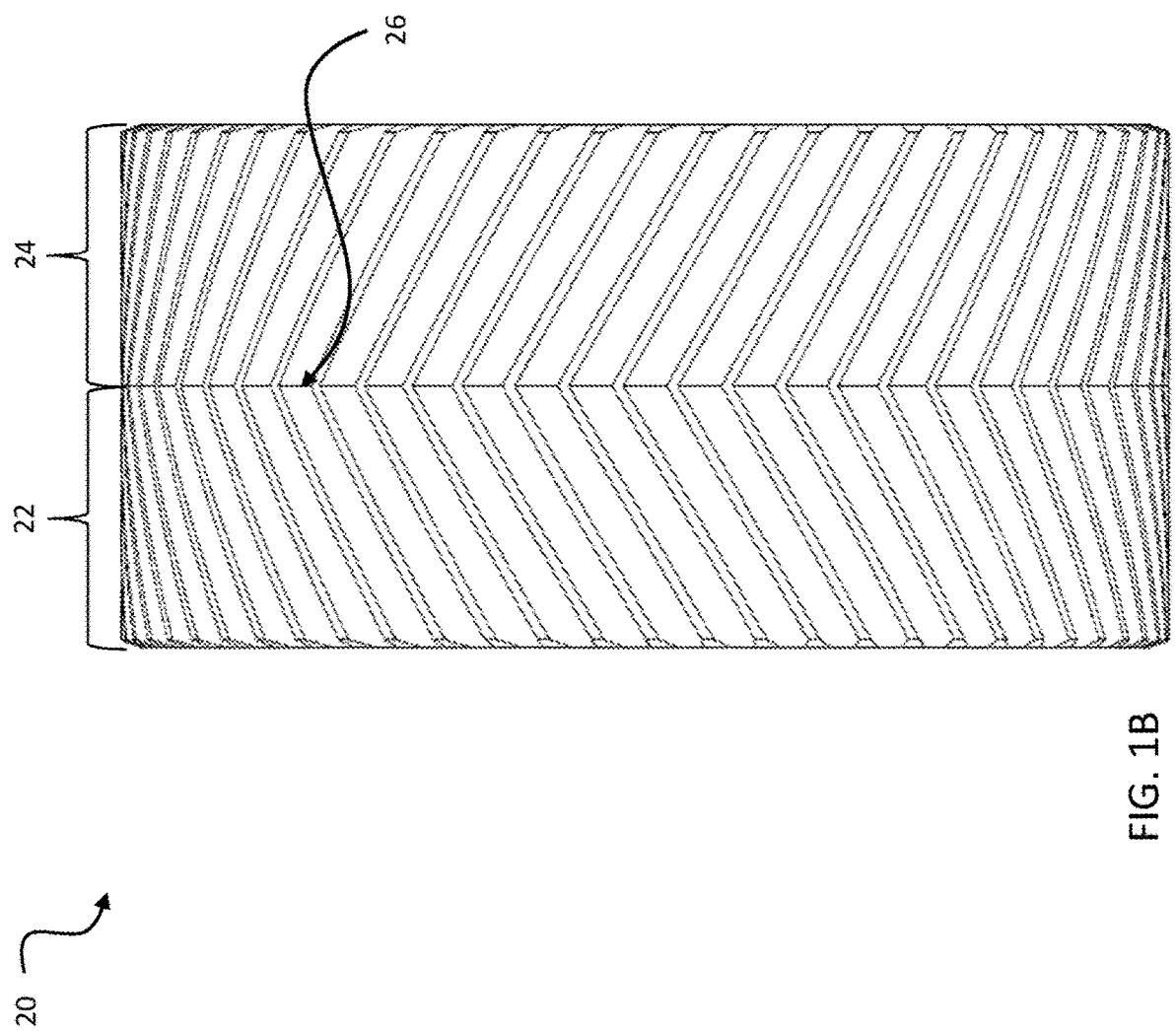
FIG. 1B is a front view of an example of a herringbone gear.

Helical gears, and in particular, double helical or herringbone gears are preferred for use in high speed and high torque gearboxes. However, manufacturing limitations typically affect how these gears are formed. For instance, a herringbone gear, as shown in FIG. 1B, cannot be finished by grinding due to manufacturing limitations. A double-helical gear that may be finish-ground is illustrated in FIG. 1A and includes an apex gap 16. Specifically, in order to finish-grind the gear teeth, current manufacturing techniques employ a grinding wheel which necessitates the presence of this gap at the apex of the V formation as shown. This gap is required since, when forming one tooth of the V formation, the grinding wheel would otherwise collide with the other tooth of the V formation. The double-helical gear 10 of FIG. 1A includes a first side 12 having a helical gear pattern of a first hand, a second side 14 having a helical gear pattern of a second hand, opposite the first hand. The first side 12 and second side 14 of the gear 10 abut one another at an apex 16 defined axially there between. The double-helical gear 10 has a relatively high gear contact ratio owing to the presence of the helical gear patterns of the first and second sides 12 and 14. As a result, a gear mesh of the double-helical gear 10 exhibits increased strength and reduced noise signature as compared to that of a straight spur gear. As a result of the processes and machines used to shape and precision grind the gear teeth, the available geometries of the gear are restricted. The additional material needed to provide the apex gap 16 adds considerable weight and size penalty to an overall transmission system in which the double-helical gear 10 resides, without providing any useful function.

Typically, when formed via various machining methods, herringbone gears, such as shown in FIG. 1B, are designed such that a sharp corner is formed at the apex 16 of the right hand and left hand gear teeth. This sharp corner generates an undesirable stress concentration. Alternatively, when manufactured via milling, some herringbone gears are formed with a fillet radius at the apex. However, the fillet radius becomes a non-functional area of the gear teeth due to current manufacturing limitations, making the gear less efficient and heavier than desired. Such gears having a non-functional area are unsuitable for weight restrictive aerospace applications. Furthermore, since neither of these methods allow the teeth to be finish ground to improve the surface finish, this makes them additionally unsuitable for aerospace applications.

Figure 2:
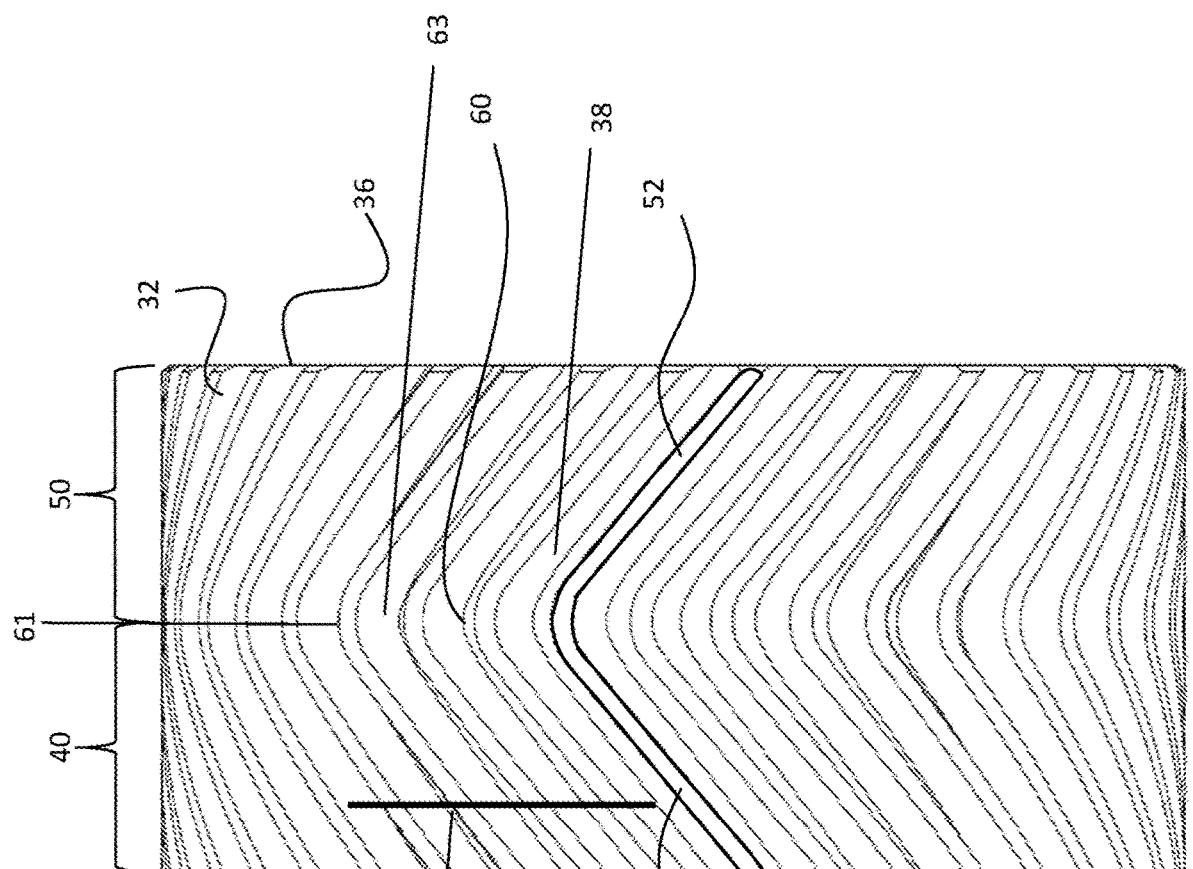
FIG. 2 is a front view of a herringbone gear according to an embodiment.

Referring now to FIG. 2, an example of a herringbone gear 30 according to an embodiment of the invention is illustrated in more detail. In one embodiment, the gear 30 as described herein may be formed via a gear grinding machine as set forth in application PCT/US2015/011572, filed on Jan. 15, 2015, the entire contents of which are incorporated herein by reference. It should be understood that in embodiments where the gear is intended for use in an aerospace application, the ground gear is a "high precision aerospace gear" having an American Gear Manufacturer's Association ("AGMA") class of 11 or higher.

The gear 30 includes a generally cylindrical body 32 having first and second axial faces 34, 36 opposite one another. A circumferential face 38 of the body 32 includes a first left hand array 40 of helical gear teeth 42. Similarly, the circumferential face 38 also includes a right hand array 50 of helical gear teeth 52, which is oppositely oriented with respect to the left hand helical 40. The first and second annular arrays 40, 50 converge such that each helical gear tooth 42 generally abuts a corresponding helical gear tooth 52.

A transition gear tooth 60 extends between each helical gear tooth 42 of the first annular array 40 and a corresponding helical gear tooth 52 of the second annular array 50. The transition gear tooth 60 includes a radius formed at the apex 61 that fluidly transitions between the gear teeth 42, 52 of the first and second annular arrays 40, 50 without an interruption in respective shapes of the helical gear teeth 42, 52 in the region of the abutment. More specifically, the transition gear tooth 60 is configured to merge tangentially with the helical gear teeth 42, 52 at the boundary defined there between. The radius of the transition gear tooth 60 is selected such that the involute form of the sides of a groove 63 between adjacent teeth 42, 52 within the transverse plane T remains constant across the width of the gear 30, including the helical gear teeth 42, 52 as well as the transition gear tooth 60. As a result, mating contact is configured to occur along the transition gear tooth 60 of the gear 30. The constant involute form within the groove 63 in the transverse plane additionally ensures conjugate motion while rolling through the entire surface area of the gear teeth 42, 52 (i.e., when an adjacent gear having teeth including a like involute form meshes with the groove 63).

As shown in FIG. 2, in order to maintain the involute form, the groove 63 has a constant distance between adjacent teeth 42, 52 in the normal plane when not in the transition gear tooth 60, and a variable distance in the normal plane which increases in proximity to the apex 61.

Figure 3A:
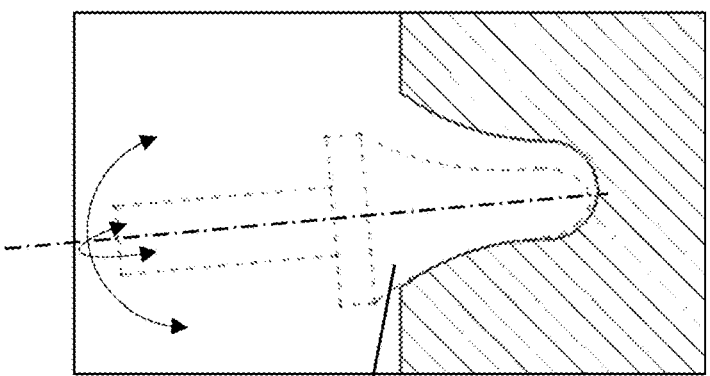
FIG. 3A is a side view of the grinding spindle as it forms a gear tooth according to an embodiment.
Figure 3:
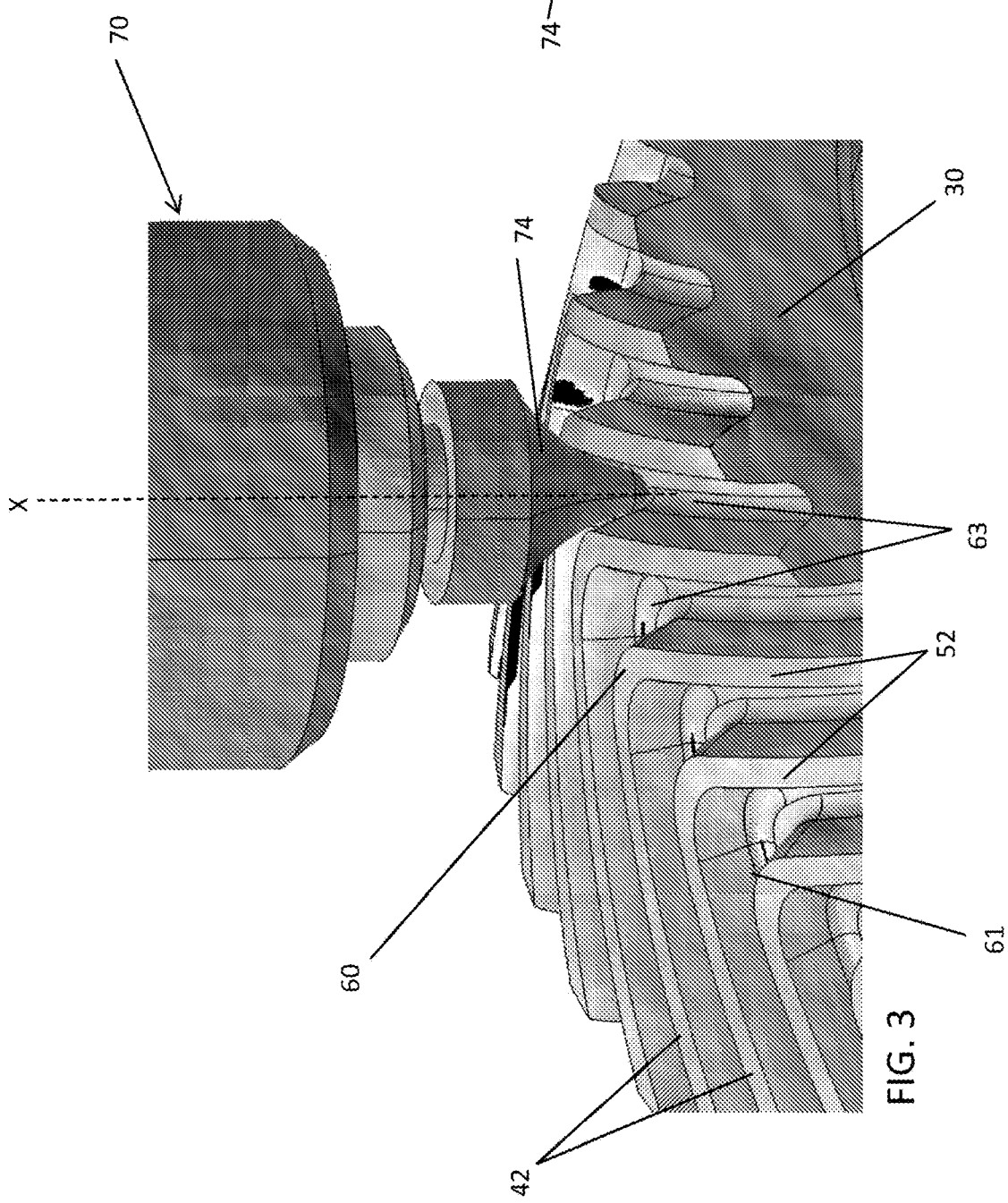
FIG. 3 is a perspective view of a grinding spindle configured to form one or more gear teeth according to an embodiment.
Figure 4:
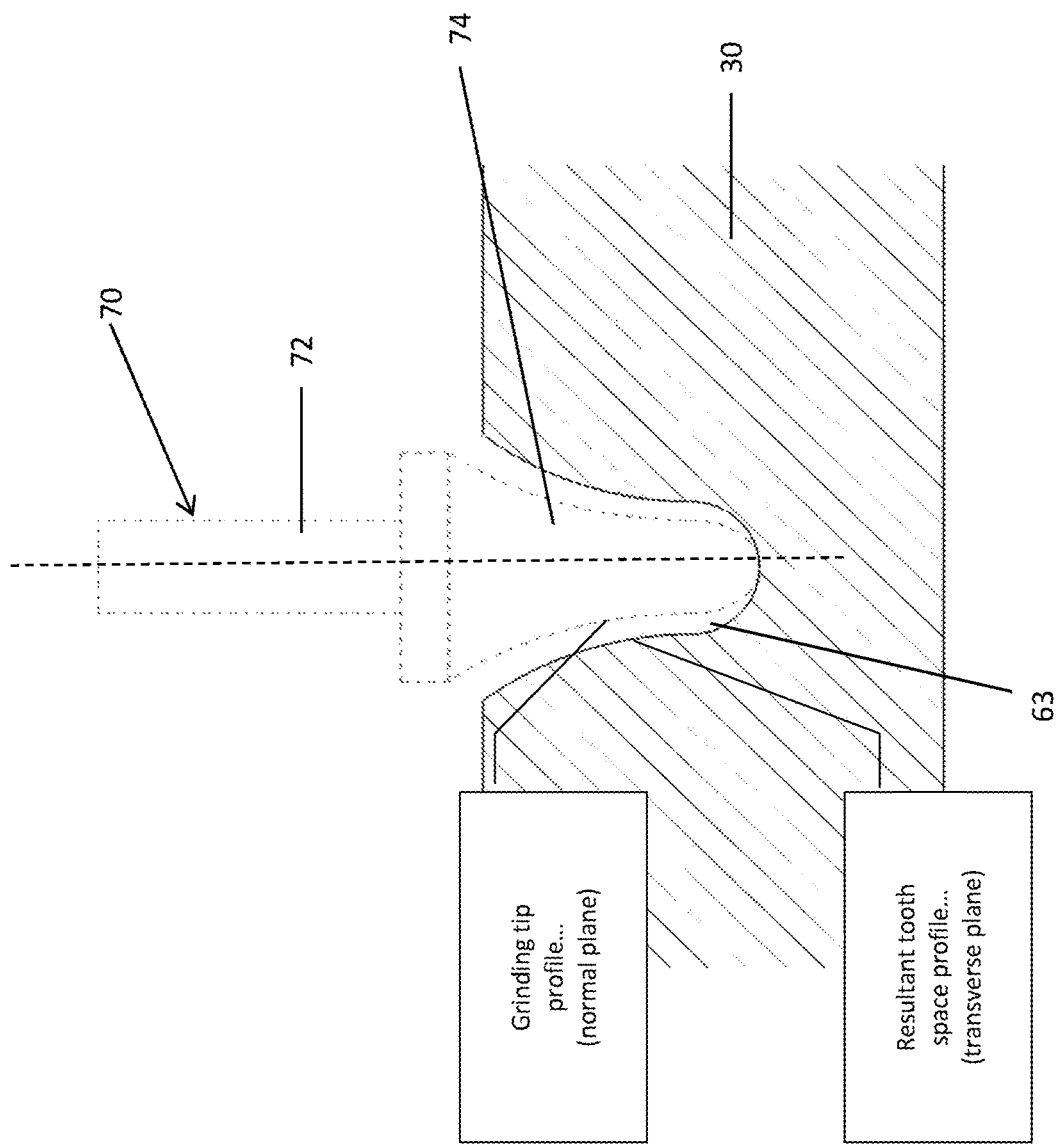
FIG. 4 is a cross-section of FIG. 3 taken in a transverse plane through the gear and spindle according to an embodiment.

A grinding spindle 70 for forming each of the gear teeth 42, 52, and transition gear tooth 60 is illustrated in more detail in FIGS. 3-5. In one embodiment, the spindle 70 may be configured to form the plurality of teeth 42, 52 and transition gear tooth 60 via electrochemical grinding. However, other types of grinding processes are also within the scope of the disclosure. As shown, the grinding spindle 70 rotates a grinding wheel 74. The grinding wheel 74 may have an involute profile to machine the groove 63 and sides of the gear teeth 42, 52. The spindle 70 and grinding wheel 74 are axially aligned and define a central longitudinal axis X of the spindle 70.

During a grinding operation, the central longitudinal axis X of the spindle 70 is arranged generally perpendicular to a rotational axis of the workpiece or gear 30. However, unlike conventional grinding wheels which have a longitudinal axis offset from and parallel to a surface of the gear 30, the spindle 70 is oriented such that the central longitudinal axis X of the spindle 70 extends through opposing sides of the workpiece 30. In addition, the grinding spindle 70 is configured to pivot within one or more planes to achieve a desired geometry. For example, as shown in the FIG. 3a, the axis X of the grinding spindle 70 is movable within a first plane and a second plane, arranged substantially perpendicular to the first plane.

Figure 5A:
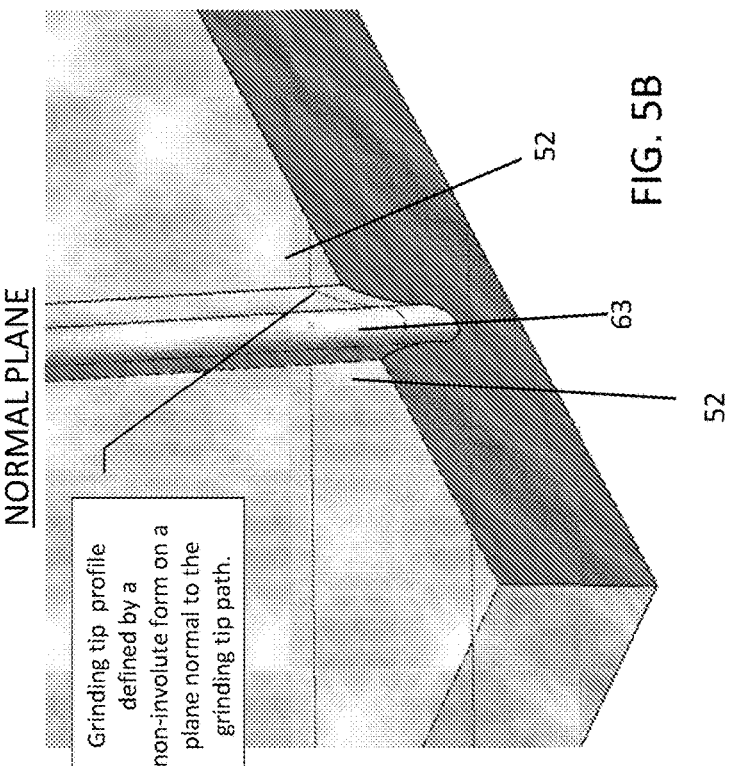
FIGS. 5A and 5B are perspective views of a transverse plane and a normal plane of a gear tooth during formation of a gear according to an embodiment.
Figure 5B:
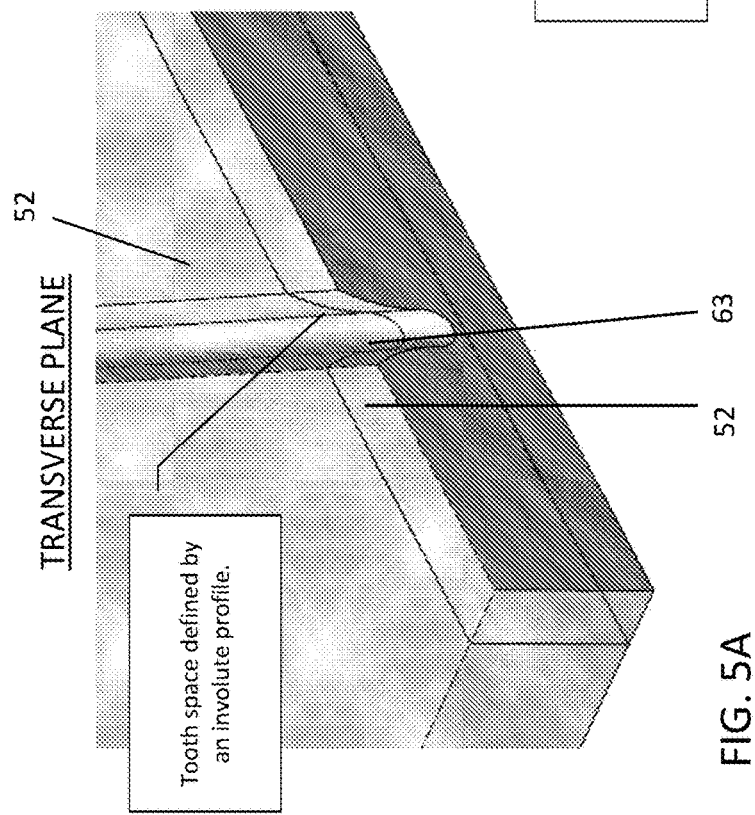

The grinding spindle 70, and more particularly, the grinding wheel 74, may be maneuvered to create a constant involute form of at least a first gear tooth 42, apex transition gear tooth 60, and second gear tooth 52 in single or multiple operations or passes of the spindle 70 across a width of the gear 30. As illustrated in the FIGS. 4 and 5a-5b, the spindle 70 moves generally linearly along a path to create the groove 63 that defines a constant involute form of the sides of the first gear tooth 42 when viewed in a transverse plane (FIG. 5a). When creating the transition gear tooth 60, the normal plane, within which the grinding wheel 74 is positioned and is perpendicular to the groove 63, gradually rotates as the spindle 70 moves between second annular arrays 40, 50 until the normal plane is substantially aligned with the transverse plane at the apex 61. As the grinding wheel 74 moves through the transition 60, the longitudinal axis X of the grinding spindle 70 is rotated or varied in the first and second planes as shown in FIG. 3A to account for this continuous change in the orientation of the normal plane to maintain a constant involute form in a transverse plane within the transition gear tooth 60. The grinding wheel 74 then moves generally linearly along a path that defines a constant involute form of the second gear tooth 52 when viewed in a transverse plane. Together, these movements comprise single or multiple passes or operations of the grinding spindle 70. This multi-axis movement is employed to maintain correct working tooth geometry, particularly in the apex transition gear tooth 60, where it may be machined in multiple passes. This operation may be repeated in the same direction, or alternatively, in reverse to form the plurality of gear teeth 42, 52 and transition gear tooth 60 of the gear 30. In one embodiment, the finish ground herringbone gear 30 has a surface finish of about 10 Ra.

A herringbone gear 30 having the transition gear tooth 60 as described herein is stronger in bending. Elimination of a non-functional apex gap 16 shown in FIG. 1A provides a reduction in weight. The resulting weight reduction improves the performance of aircraft, including reduced fuel consumption, longer flight range, increased payload, and higher speeds. In addition, prior methods of manufacturing herringbone gears resulted in a surface finish of about 100-150 Ra. However, a finish ground high precision aerospace gear as disclosed herein would have a surface finish of about 10 Ra.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. By way of example, aspects of the invention can be used in non-aerospace gear applications, such as for helical gears used in automotive, maritime, industrial, elevator and locomotive applications. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A herringbone gear, comprising:
a cylindrical body having a circumferential face having a width;
a first helical gear tooth on the circumferential face having a first configuration;
a second helical gear tooth on the circumferential face having a second configuration other than the first configuration; and
a transition on the circumferential face extending between the first helical gear tooth and the second helical gear tooth such that an involute form taken within a transverse plane of the circumferential face which remains constant over the width.

2. The herringbone gear according to claim 1, wherein the transition includes a groove between adjacent gear teeth in the transition, the groove defining a variable distance between the adjacent gear teeth in a normal plane, the normal plane being normal to a path of the groove.

3. The herringbone gear according to claim 2, wherein the variable distance increases as the path extends from a side of the transition toward an apex of the groove.

4. The herringbone gear according to claim 1, wherein the first configuration and the second configuration are opposites.

5. The herringbone gear according to claim 1, wherein the transition includes a radius.

6. The herringbone gear according to claim 1, wherein conjugate motion occurs over an entire surface of the first helical gear tooth, the transition gear tooth and the second helical gear tooth when meshed with a corresponding herringbone gear.

7. The herringbone gear according to claim 1, wherein the herringbone gear is installed within a power transmission assembly.

8. The herringbone gear according to claim 1, wherein the power transmission assembly is part of a rotary wing aircraft.

9. A method of forming a double-helical gear, comprising:
forming a portion of an aligned first gear tooth, transition gear tooth and second gear tooth via a single pass of a spindle such that an involute form taken within a transverse plane remains constant over a width of the gear, wherein forming the portion of the transition gear tooth includes varying an orientation of a longitudinal axis of the spindle relative to the gear.

10. The method according to claim 9, wherein the longitudinal axis of the spindle is arranged perpendicular to an axis of rotation of the gear, the longitudinal axis extending through the gear.

11. The method according to claim 10, wherein forming the portion of the transition gear tooth includes varying the orientation of the longitudinal axis of the spindle relative to the gear to maintain a constant involute form in a transition between the first gear tooth and the second gear tooth.

12. The method according to claim 11, wherein a portion of the first gear tooth is formed by moving the spindle linearly.

13. The method according to claim 11, wherein a portion of the second gear tooth is formed by moving the spindle linearly.

14. The method according to claim 10, wherein the spindle includes a grinding wheel configured to rotate about the longitudinal axis of the spindle.

15. The method according to claim 10, wherein the spindle is configured to removed material from the gear via electrochemical grinding.

* * * * *